United States Patent
Huang et al.

(10) Patent No.: US 11,602,921 B2
(45) Date of Patent: Mar. 14, 2023

(54) ELASTIC CONDUCTIVE COMPOSITE FABRIC CAPABLE OF DETECTING AND PROVIDING ELECTRICAL SIGNALS ACCORDING TO REFLECTIONS OF LIMBS AND BODY MOVEMENTS

(71) Applicant: Zhen Ding Technology Co., Ltd., Taoyuan (TW)

(72) Inventors: Chi-Fei Huang, Taoyuan (TW); Sheng-Feng Chung, Taoyuan (TW); Shou-Jui Hsiang, Tayuan (TW)

(73) Assignee: Zhen Ding Technology Co., Ltd., Taoyuan (TW)

( * ) Notice: Subject to any disclaimer, the term of this patent is extended or adjusted under 35 U.S.C. 154(b) by 59 days.

(21) Appl. No.: 16/511,222

(22) Filed: Jul. 15, 2019

(65) Prior Publication Data

US 2020/0338868 A1 Oct. 29, 2020

(30) Foreign Application Priority Data

Apr. 29, 2019 (CN) .......................... 201910353499.7

(51) Int. Cl.
*B32B 25/10* (2006.01)
*B32B 5/02* (2006.01)
*B32B 25/02* (2006.01)

(52) U.S. Cl.
CPC .............. *B32B 25/10* (2013.01); *B32B 5/024* (2013.01); *B32B 25/02* (2013.01);
(Continued)

(58) Field of Classification Search
CPC ......... B32B 25/10; B32B 5/024; B32B 25/02; B32B 2307/202; B32B 2307/51; B32B 2437/00; B32B 2457/00
(Continued)

(56) References Cited

U.S. PATENT DOCUMENTS

| 8,191,433 B2 * | 6/2012 | Tao ........................ D06M 11/83 73/862.474 |
| 2013/0260129 A1 * | 10/2013 | Agzikara ................. D01H 5/70 428/221 |

(Continued)

FOREIGN PATENT DOCUMENTS

| CN | 101598529 A | 12/2009 |
| CN | 102037172 A | 4/2011 |

(Continued)

OTHER PUBLICATIONS

Mattmann, Corinne; et al., "Sensor for Measuring Strain in Textile", Jun. 3, 2008 (Year: 2008).*

(Continued)

*Primary Examiner* — Callie E Shosho
*Assistant Examiner* — Steven A Rice
(74) *Attorney, Agent, or Firm* — ScienBiziP, P.C.

(57) ABSTRACT

A composite fabric which is elastic and conductive and thus able to detect a user's limb and body movements includes a fabric layer and an elastic conductive layer of elastomer and conductive filler formed on the fabric layer. A resistance value and a strain increments of the fabric satisfy a relationship of $R_T=R+n\varepsilon$ or $R_T=R+m\ e^{n\varepsilon}$, wherein $\varepsilon$ denotes the strain increment, R denotes the resistance value when the strain increment is 0, and $R_T$ denotes the resistance value when deformed through the increments. The m and n are coefficients, being a whole number or a fraction. A user can immediately detect and know the movements of his limbs according to the resistance value of the elastic conductive composite fabric.

1 Claim, 4 Drawing Sheets

(52) U.S. Cl.
CPC ..... *B32B 2307/202* (2013.01); *B32B 2307/51* (2013.01); *B32B 2437/00* (2013.01); *B32B 2457/00* (2013.01)

(58) Field of Classification Search
USPC ......................................................... 442/182
See application file for complete search history.

(56) References Cited

U.S. PATENT DOCUMENTS

2017/0089782 A1* 3/2017 Hirt ........................ A61B 5/01
2022/0151529 A1* 5/2022 Shimizu ................ A61B 5/287

FOREIGN PATENT DOCUMENTS

| CN | 105424238 A | 3/2016 |
| TW | 201907815 A | 3/2019 |

OTHER PUBLICATIONS

Lee, Jaehong; et al., "Conductive Fiber-Based Ultrasensitive Textile Pressure Sensor for Wearable Electronics", Feb. 18, 2015 (Year: 2015).*
Omnexus, "Complete Guide on Thermoplastic Polyurethanes (TPU)", Nov. 29, 2018 (Year: 2018).*
He, Zuoli; et al., "Highly stretchable multi-walled carbon nanotube/thermoplastic polyurethane composite fibers for ultrasensitive, wearable strain sensors", Mar. 12, 2019, Nanoscale, vol. 11, p. 5885 (Year: 2019).*

* cited by examiner

ELASTIC CONDUCTIVE COMPOSITE FABRIC CAPABLE OF DETECTING AND PROVIDING ELECTRICAL SIGNALS ACCORDING TO REFLECTIONS OF LIMBS AND BODY MOVEMENTS

FIELD

The subject matter of the application relates to intelligent wearable products.

BACKGROUND

In recently, intelligent wearable products are used in information, entertainment, healthcare, and exercises. The main functions of the intelligent wearable products are to detect and monitor the signals of physiology and limbs movements from wearer. The intelligent wearable products could be devices, accessories, garments, fabrics, etc. The garments or fabrics have been developed from traditional textiles and changed into wearable technology. Intelligent wearable products possess conductive property because of the detection and transmissions of signals often rely on electronic device.

Numerous of researchers showed that the intelligent wearable products have been made of fabrics or garments with conductive yarns by textile engineering. The variations of electric resistances of conductive fabrics have been transferred to signals. These wearable products have been expected to get the clear and strong signals from wearers in dynamic situation for detection and monitoring. For example, exercises and body workout depend on the range of four-limb movements (such as flexion and extension), which directly correlate with results and effect of training. However, the conductive fabrics get unstable signals from the extension of the wearer's limb movements due to the poor contacts.

Some studies attempted to improve elastic property of conductive fabrics to fit wearers, such as knitted structure and mounted elastic yarns. The results are showed that the problems of stability and hysteresis of electrical resistance are unsolved. For the foregoing reasons, the fabrics are meditated on composite structure. The elastic and conductive properties of fabrics are improved by extrinsic materials. The composite structure of fabric has good elastic recovery and the variation of electrical resistance could reflect the limbs movement. Furthermore, the flexibility have also been considered.

Therefore, there is room for improvement in the art.

BRIEF DESCRIPTION OF THE DRAWINGS

Implementations of the present disclosure will now be described, by way of embodiments, with reference to the attached figures.

DETAILED DESCRIPTION

Figure 1:
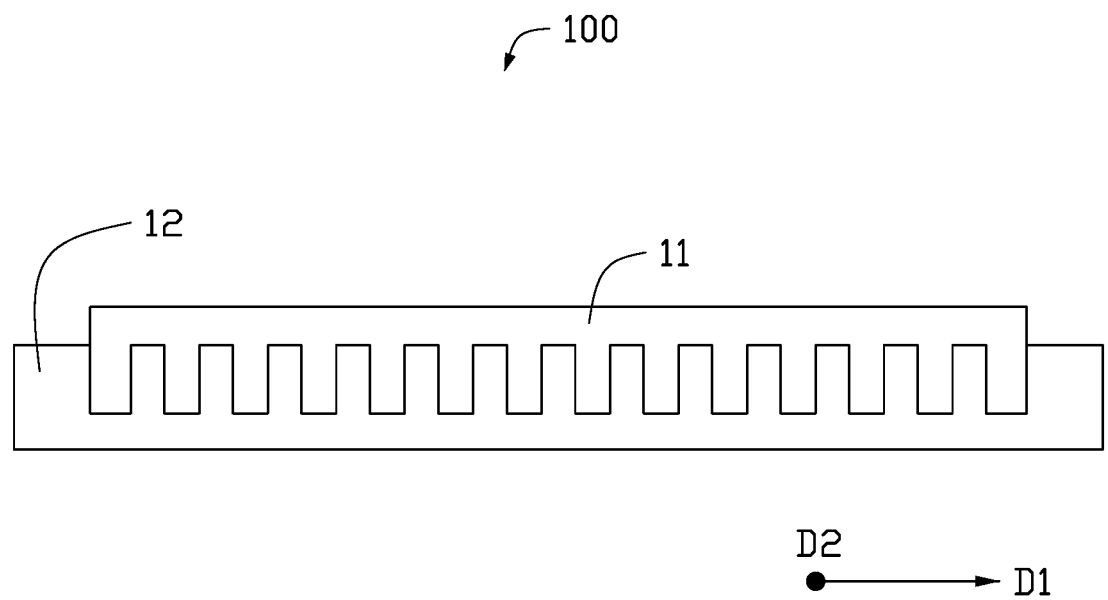
FIG. 1 is a view of an embodiment of an elastic conductive composite fabric according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain portions may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 2:
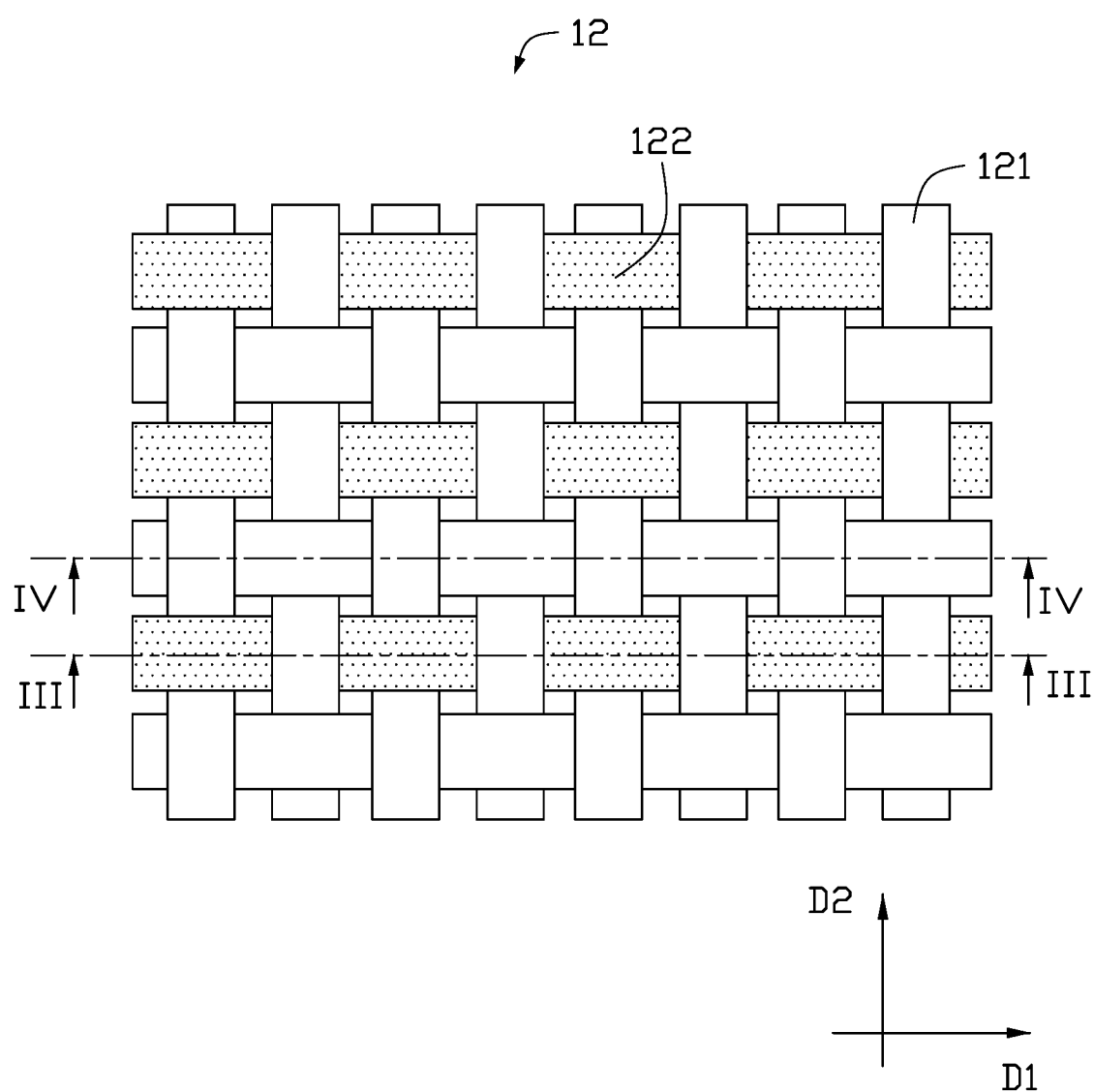
FIG. 2 is a top view of a fabric layer of the elastic conductive composite fabric of FIG. 1.
Figure 3:
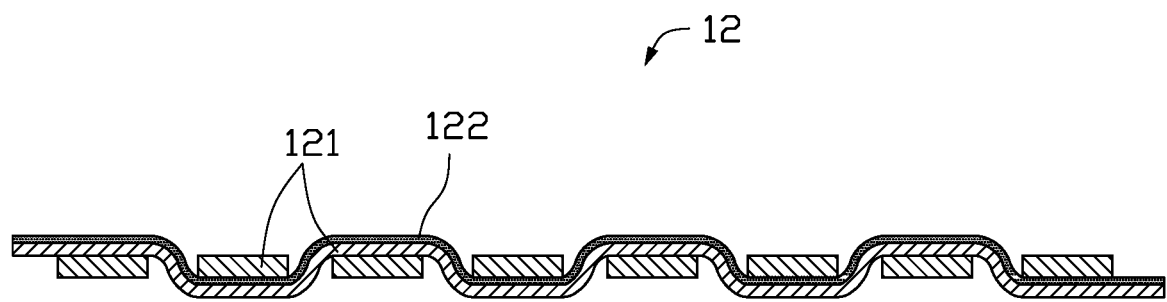
FIG. 3 is a cross-section view along line of FIG. 2.
Figure 4:
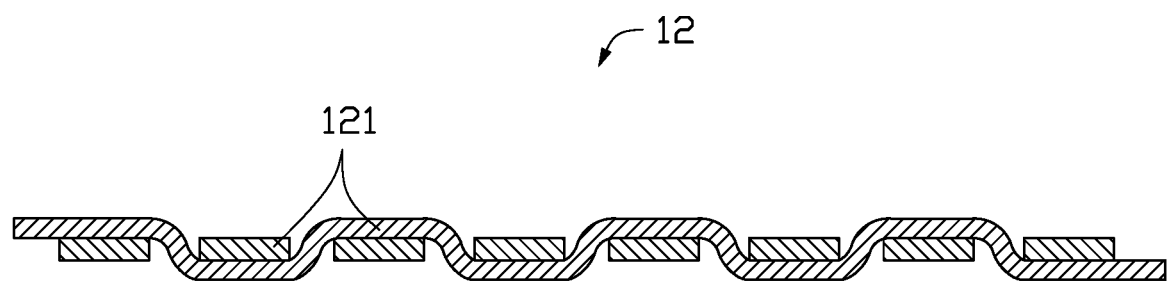
FIG. 4 is a cross-section view along line IV-IV of FIG. 2.

FIGS. 1-3 show an elastic conductive composite fabric 100 of the present disclosure. The elastic conductive composite fabric 100 includes a fabric layer 12 and an elastic conductive layer 11 formed on the fabric layer 12. The fabric layer 12 is elastic. The elastic conductive layer 11 includes elastomer and conductive filler. A resistance value and a strain increment of the elastic conductive composite fabric 100 satisfy a relationship of $R_T = R + n\varepsilon$ or $R_T = R + m\ e^{n\varepsilon}$. Wherein $\varepsilon$ denotes the strain increment, R denotes the resistance value when the strain increment is 0, and $R_T$ denotes the resistance value when the elastic conductive composite fabric 100 is deformed by an external force, and m and n are coefficients. The coefficients can be a whole number or a fraction.

Since the elastic conductive composite fabric 100 is elastic, the elastic conductive composite fabric 100 can respond to deformation immediately when the elastic conductive composite fabric 100 is loaded with external force, and can quickly return to the original state when the external force is unloaded.

Since the elastic conductive composite fabric 100 is conductive, the elastic conductive composite fabric 100 can connect to external devices or electronic components. The resistance value of the elastic conductive composite fabric 100 corresponds to the strain increment of the elastic conductive composite fabric 100. The resistance value and strain increment of the elastic conductive composite fabric 100 has an exponential or a linear relationship, so the resistance value of the elastic conductive composite fabric 100 can be converted to a signal. The signal which is output and can be analyzed, so the user can immediately determine and know his own limb movement.

The fabric layer 12 includes a fabric main body 121 and elastic yarns 122. The elastic yarns 122 are woven in the fabric main body 121 along a first direction $D_1$ and/or a second direction $D_2$. The first direction $D_1$ is perpendicular to the second direction $D_2$. In at least one embodiment, the elastic yarns 122 are woven in the fabric main body 121 along a first direction $D_1$.

A diameter of each of the elastic yarns 122 is from 60 to 100 deniers. In at least one embodiment, the diameter of each of the elastic yarns 122 is 80 deniers.

The elongation of the fabric layer 12 in the first direction $D_1$ and/or in the second direction $D_2$ can be 10% to 50% of an initial length of the fabric layer 12.

The possible elongation of the fabric layer 12 can be designed according to a user's physique, and the diameter of the elastic yarn 122 and the structure of the fabric layer 12 can also be adjusted likewise.

The elastic conductive composite fabric 100 has a coefficient of elasticity $E_1$, the fabric layer 12 has a coefficient of elasticity $E_2$. A ratio between the $E_1$ and $E_2$ is from 1.2 to 1.6 to make the elastic conductive composite fabric 100 instantly respond to limb movement when being worn.

The fabric main body 121 is made from a woven, a knitted fabric or a three-dimensional fabric. Materials of the fabric main body 121 may be TC blended yarn, polyester, nylon, polyacrylonitrile, or the like. Among them, TC blended yarn refers to polyester and cotton blended yarn.

Material of the elastic yarns 122 is a polyurethane (PU) material, and may be an OP yarn, a spandex fiber, a Lycra fiber, or the like. In at least one embodiment, the material of the elastic yarn 122 is a fiber having a trade name of Lycra.

In at least one embodiment, the elastic conductive layer 11 is a preformed patterned film. The preformed patterned film is pressed onto the fabric layer 12 under a low temperature to make the preformed patterned film adhere to the fabric layer 12. The low temperature is from 90° C. to 130° C.

In other embodiment, the elastic conductive layer 11 is directly coated or screen printed on the fabric layer 12. The elastic conductive layer 11 is made by steps of forming a solution of the elastomer and the conductive filler. The solution is coated or screen printed onto the fabric layer 12 to form a middle layer. The middle layer is patterned to form a patterned layer. The patterned layer is dried by hot air with a low temperature to form the elastic conductive layer 11. The low temperature here is from 80° C. to 140° C.

The elastic conductive layer 11 is adhesive and the elastic conductive layer is adhesively combined with the fabric layer 12, so that the elastic conductive composite fabric 100 can be deformed without interface delamination.

In at least one embodiment, the conductive filler has a mass percentage from 30% to 60% of a total mass of the elastic conductive layer 11. The elastic conductive layer 11 has a resistance value in a range from $10^{-1}$ to $10^{-4}$ ohms.

In other embodiment, the conductive filler has a mass percentage from 10% to 30% of a total mass of the elastic conductive layer 11. The elastic conductive layer 11 has a resistance value in a range from $10^2$ to $10^5$ ohms.

The conductive filler is in a form of particle, powder, wire, or fiber.

The conductive filler is made by a conductive metal material or a non-metal material. In at least one embodiment, the conductive filler can be made of a metal material such as gold, silver, copper, iron, nickel, or stainless steel, or a non-metal material such as carbon black, graphene, nanotubes, or a conductive polymer.

The elastomer is an elastic polymer material. The elastomer may be a styrene, an olefin, a diene, a vinyl chloride, a urethane, an ester, an amide, an organic fluorine, a silicone, or an ethylene thermoplastic elastomer.

In at least one embodiment, the elastomer may be styrene/butadiene/styrene block copolymer (SBS), styrene/isoprene/styrene block copolymer (SIS), styrene/hexene-butene/styrene block copolymer (SEBS), styrene/ethylene-propylene/styrene block copolymer (SEPS), thermoplastic polyurethane (TPU), and the like.

The resistance value and the strain increment of the elastic conductive composite fabric 100 satisfy the relationship of $R_T = R + n\varepsilon$, wherein n is from 1.0 to 2.5.

The resistance value and the strain increment of the elastic conductive composite fabric 100 satisfy the relationship of $R_T = R + m\, e^{n\varepsilon}$, wherein m is from 9.0 to 10.0, and n is from 0.05 to 0.06.

Examples 1-2 are described.

Example 1

Firstly, a conductive filler is uniformly mixed with a TPU (elastomer). The conductive filler has a mass percentage of 30% of the total mass of the conductive filler and the elastomer. Secondly, the mixed conductive filler and the elastomer are put into a jig having a pattern to obtain an elastic conductive layer 11. Thirdly, the elastic conductive layer 11 is pressed onto the fabric layer 12 for 8 to 35 seconds, the temperature of the pressing is from 90° C. to 130° C., under a pressure from 2 MPa to 8 MPa. The elastic conductive layer 11 and the fabric layers 12 are joined together to obtain an elastic conductive composite fabric 100. The elastic conductive composite fabric 100 has a resistance value between $10^0\Omega$ and $10^3\Omega$. Fourthly, a force is applied to the elastic conductive composite fabric 100 to cause the elastic conductive composite fabric 100 to stretch. Finally, the resistance values of the elastic conductive composite fabric 100 at different forces and the lengths of each strain increment of the elastic conductive composite fabric 100 are measured.

In example 1, the resistance value $R_T$ and the strain increment $\varepsilon$ of the elastic conductive composite fabric 100 satisfy the relationship of $R_T = 10.35\, e^{0.33\varepsilon}$, where $\varepsilon$ can be a whole number or a fraction of a whole number.

Example 2

Firstly, a conductive filler is uniformly mixed with TPU and SEBS (elastomer). The conductive filler has a mass percentage of 60% of the total mass of the conductive filler and the elastomer. Secondly, the mixed conductive filler and the elastomer are directly screen printed on the fabric layer 12. Thirdly, the mixed conductive filler and the elastomer screen printed on the fabric layer 12 are dried to obtain an elastic conductive layer 11 and an elastic conductive composite fabric 100. The drying temperature is 110° C. and the drying time is 20 minutes. The elastic conductive composite fabric 100 has a resistance value between $10^{-1}\Omega$ and $10^2\Omega$. Fourthly, stretching forces are applied to the elastic conductive composite fabric 100, and the resistance values of the elastic conductive composite fabric 100 at different forces and the lengths of each strain increment of the elastic conductive composite fabric 100 are measured.

In example 2, the resistance value $R_T$ and the strain increment $\varepsilon$ of the elastic conductive composite fabric 100 satisfy the relationship of $R_T = 0.75 + 1.68\varepsilon^\varepsilon$, where $\varepsilon$ can be a fraction or a whole number.

The fabric layer 12 of the elastic conductive composite fabric 100 of the disclosure is insulated from the body of the user, and the elastic conductive layer 11 is not in contact with the body of the user, therefore the body of the user does not affect the resistance value of the elastic conductive composite fabric 100.

As a fabric, the elastic conductive composite fabric 100 is breathable, skin-friendly, comfortable, and soft The embodiments shown and described above are only examples. Many details are often found in the relevant art, thus many such details are neither shown nor described. Even though numerous characteristics and advantages of the present disclosure have been set out in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. An elastic conductive composite fabric comprising:
a fabric layer, wherein the fabric layer comprises a fabric main body and elastic yarns, the elastic yarns are woven in the fabric main body along a first direction $D_1$ and a second direction $D_2$, the first direction $D_1$ is perpendicular to the second direction $D_2$, the woven elastic yarns form a plurality of pores, an elongation of the fabric layer in the first direction $D_1$ and/or in the second direction $D_2$ is 10% to 50% of an initial length of the fabric layer; and an elastic conductive layer formed on the fabric layer and filling into the plurality of pores; wherein the elastic conductive layer comprises elastomer and conductive filler, the elastomer is selected from a group consisting of styrene/butadiene/styrene block copolymer (SBS), styrene/isoprene/styrene block copolymer (SIS), styrene/hexene-butene/styrene block copolymer (SEBS), styrene/ethylene-propylene/styrene block copolymer (SEPS), and thermoplastic polyurethane (TPU), the elastic conductive layer is bonded with the fabric layer, a resistance value and a strain increment of the elastic conductive composite fabric satisfy a relationship of $R_T=R+n\varepsilon$ or $R_T=R+m\, e^{n\varepsilon}$; wherein $\varepsilon$ denotes the strain increment, R denotes the resistance value when the strain increment is 0, and $R_T$ denotes the resistance value when deformed through the increment, m and the n are coefficient, and the coefficient is a whole number or a fraction.

* * * * *